March 26, 1968

L. G. KILMER 3,374,853

TRANSPORTABLE SEISMIC WAVE GENERATOR SUPPORT

Filed April 22, 1966

INVENTOR
LAUREN G. KILMER

BY McLean, Morton & Baustead

ATTORNEYS.

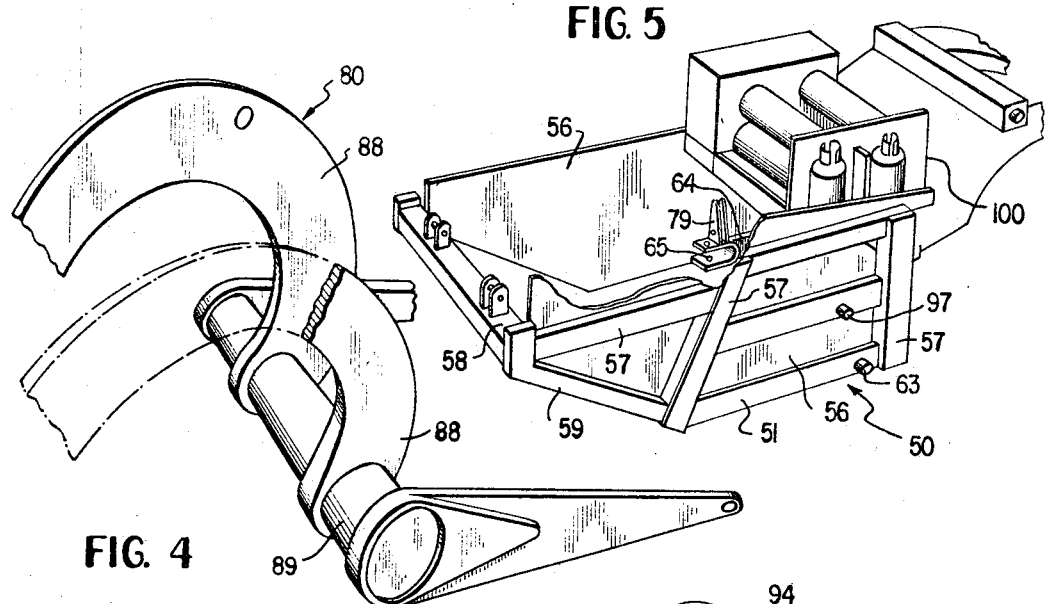
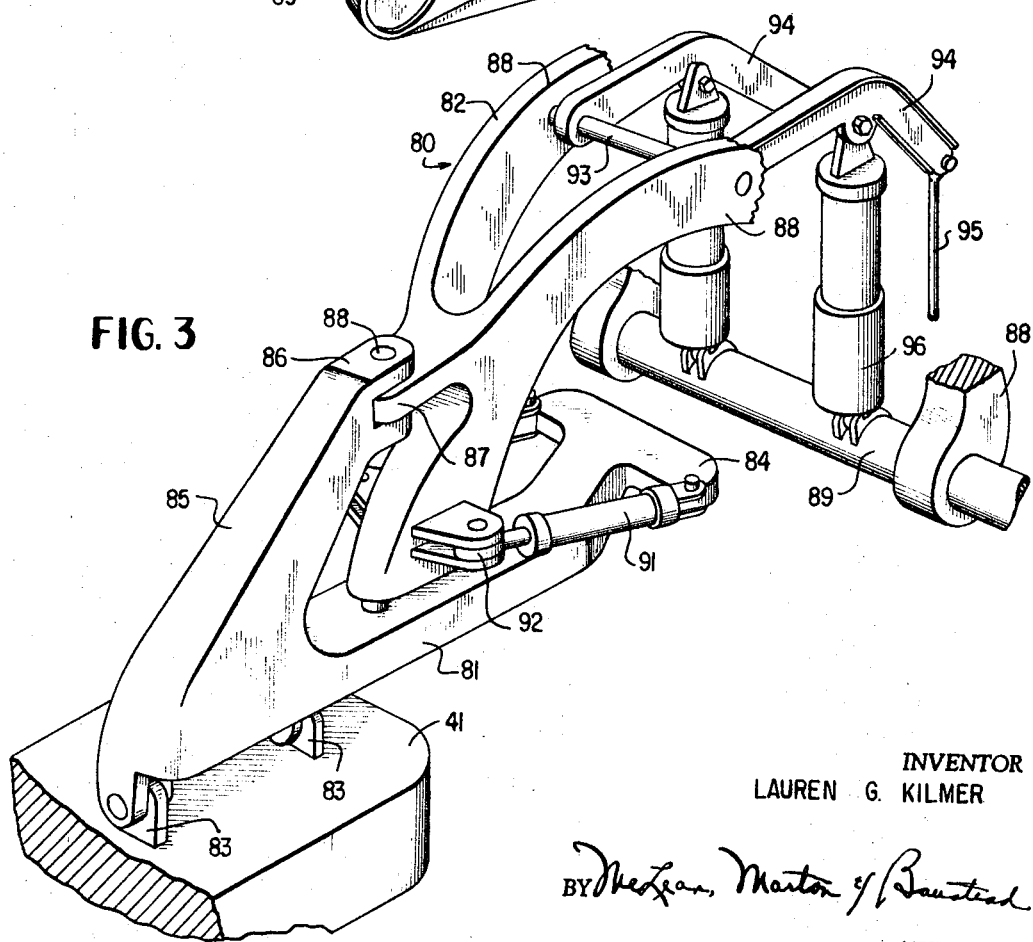

March 26, 1968    L. G. KILMER    3,374,853
TRANSPORTABLE SEISMIC WAVE GENERATOR SUPPORT
Filed April 22, 1966    3 Sheets-Sheet 3

INVENTOR
LAUREN G. KILMER
BY McLean, Morton & Boustead
ATTORNEYS.

United States Patent Office 3,374,853
Patented Mar. 26, 1968

3,374,853
TRANSPORTABLE SEISMIC WAVE
GENERATOR SUPPORT
Lauren G. Kilmer, Tulsa, Okla., assignor, by mesne assignments, to Sinclair Research, Inc., New York, N.Y., a corporation of Delaware
Continuation-in-part of application Ser. No. 321,743, Nov. 6, 1963. This application Apr. 22, 1966, Ser. No. 544,482
4 Claims. (Cl. 181—.5)

ABSTRACT OF THE DISCLOSURE

A two-part, transportable seismic wave generator support permitting engagement of the generator between forward and rear supporting wheels which is capable of moving the generator vertically including a shock absorbing unit arranged between the two parts thereof.

This application is a continuation-in-part of my patent application Ser. No. 321,743, filed Nov. 6, 1963, now U.S. Patent No. 3,295,630.

My invention relates to seismic prospecting and in particular is directed to the generation of seismic waves by devices for converting energy at the earth-air interface into seismic energy, which require the superposition of substantial mass for efficient coupling with the ground, as, for example, gas exploders.

In the devices employed in seismic prospecting with which the present invention is concerned, the seismic wave is initiated by a pulse at the surface of the earth generated by a device resting on the ground. As described in my co-pending application Ser. No. 187,111, filed Apr. 12, 1962, now U.S. Patent No. 3,235,027, and Ser. No. 314,230 filed Oct. 7, 1963, now U.S. Patent No. 3,314,497, a gas explosion confined in an expansible chamber acting at the earth-air interface against a large mass positioned above such gas explosion can be utilized to impart a comprehensive pulse to the surface of the earth beneath the gas explosion threby initiating a seismic wave. If the explosion is confined in a device having a rigid top (carrying the weight of the large mass) and rigid bottom with vertically extensible sidewalls, the seismic wave generated is useful for seismic prospecting by refraction and reflection techniques, since the pulse imparted to the surface of the earth has a high energy content and can be made of extremely short duration.

It has been found that with such devices, the useful energy imparted to the earth occurs at the moment of the explosion before there is any significant upward movement of the top of the device occuring as a result of the explosion. It is therefore feasible to dampen movement of the chamber resulting from the explosion and also to vent the chamber the moment vertical extension of the sidewalls occurs so as to prevent secondary seismic waves, etc. It is also evident, however, that the device producing the pulse must be properly coupled with the earth in order to obtain maximum conversion of the energy released by the device into seismic energy.

Coupling of the seismic wave generator described above with the ground can be accomplished as described in my co-pending application Ser. No. 321,743 filted Nov. 6, 1963, now Patent No. 3,295,630, by supporting the generator on a wheeled vehicle which has a seismic wave generator support arrangement permitting engagement of the seismic wave generator between forward supporting wheels and rear supporting wheels which is capable of moving the generator approximately vertically such that the generator can be lifted clear of the ground or can be positioned down on the ground as a support for the vehicle lifting one set of wheels of the vehicle above the ground such that the vehicle rests on the other set of wheels and the seismic wave generator to provide the required large mass which couples the generator to the ground. Difficulties have, however, been experienced with this vehicle due to the rigid construction thereof which does not sufficiently dampen the vertical movements so that large shocks are applied to the vehicle causing wear on the vehicle. Also, the shocks jolt the driver of the vehicle and operator of the generator and can cause physical pain and suffering. It is accordingly an object of my invention to provide a device which can be utilized to aid in dampening vertical movement of the seismic wave generator with respect to the earth following the explosion.

In accordance with this general object it is a more specific object of my invention to provide a wheeled vehicle which has a two-part seismic wave generator support arrangement permitting engagement of the seismic wave generator between forward supporting wheels and rear supporting wheels which is capable of moving the generator approximately vertically such that the generator can be lifted clear of the ground or can be positioned down on the ground as a support for the vehicle lifting one set of wheels of the vehicle above the ground such that the vehicle rests on the other set of wheels and the seismic wave generator and which has a shock absorbing unit arranged between the two parts thereof. I am aware that heretofore shock absorbers have been suggested for dampening movement of vehicles, e.g., automobiles, etc., however, in the present instance the ability to use shock absorber units to dampen movement of the seismic wave generator is entirely unexpected since normally it would be thought that the dampening action applied to the generator would also tend to cancel out the energy desired for generation of the seismic wave. It has been found, however, that with a seismic wave generator of the type described in my copending applications referred to above, for example, wherein the rigid bottom plate is coupled with the ground this is not the case and the movement of the generator can be dampened to provide less reaction on the vehicle which improves the life expectancy and maintenance thereof and decreases the shock on the operator of the vehicle.

For a more complete understanding of the practical application of my invention reference is made to the appended drawings in which:

FIGURE 3 is a fragmentary perspective view of a portion of the vehicle shown in FIGURES 1 and 2;

FIGURE 4 is a fragmentary perspective view of another portion of the vehicle shown in FIGURES 1 and 2;

FIGURE 5 is a fragmentary perspective view of still another portion of the vehicle shown in FIGURES 1 and 2;

Figure 1:
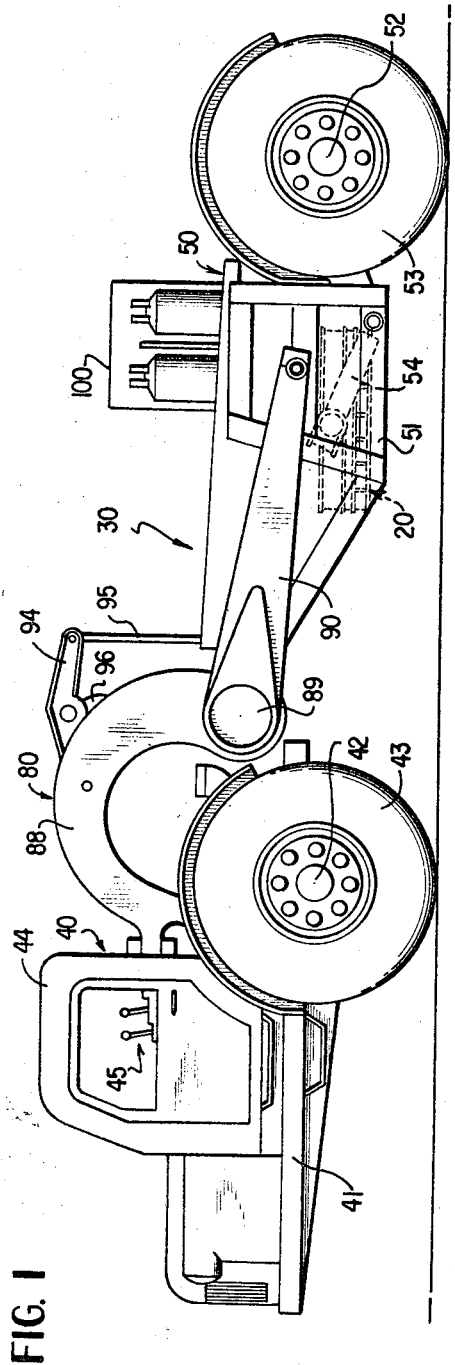
FIGURE 1 is a side elevation of a seismic wave generator being transported by a wheeled vehicle in accordance with my invention.
Figure 2:
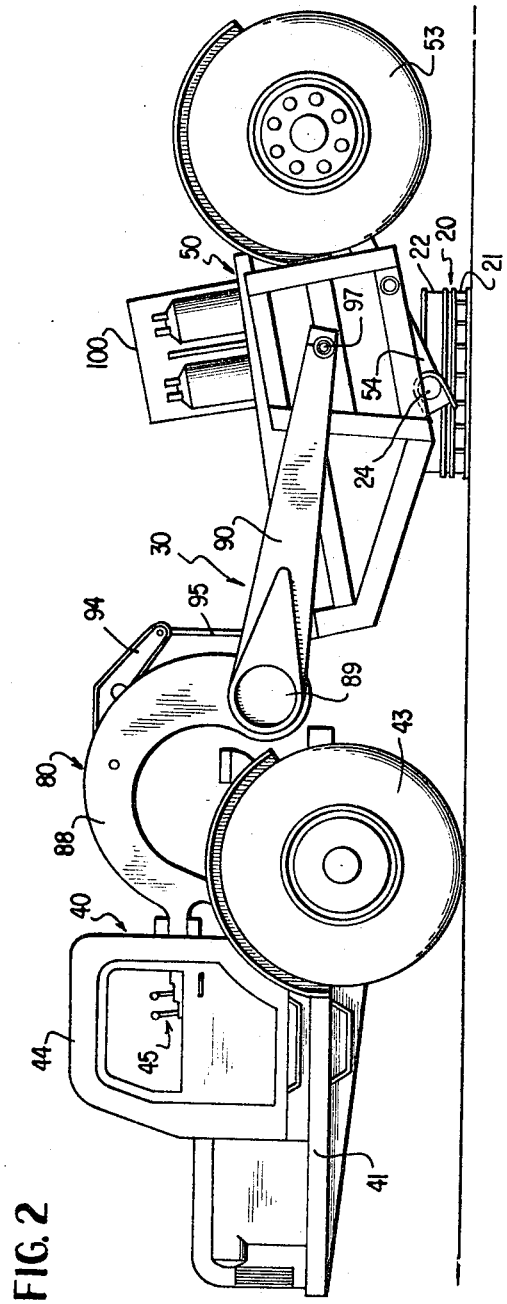
FIGURE 2 is a view similar to FIGURE 1 showing the seismic wave generator in operating position in which the mass of the vehicle is superposed on the generator to couple it with the ground.
Figure 8:
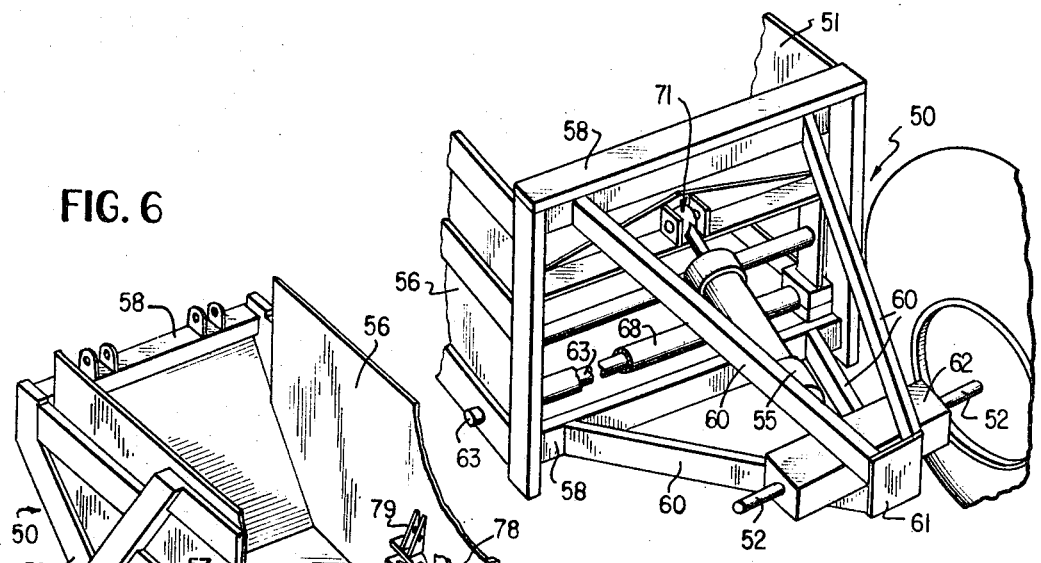
FIGURE 8 is a fragmentary perspective view of the same portion shown in FIGURE 7 but seen from a different angle of sight.

Referring more particularly to FIGURES 1 and 2 the reference number 20 designates a seismic wave generator, while the numeral 30 designates a four wheeled vehicle in accordance with my invention, intended, as shown in FIGURE 1, to transport seismic wave generator 20 from place to place and, as shown in FIGURE 2, to superpose a substantial portion of its mass on generator 20 when the latter is used to initiate a seismic wave.

Although the specific construction of generator 20 forms no part of my present invention, and generator 20 can be any suitable gas exploder or other earth-interface pulse type seismic wave generator requiring a substantial mass resting on it for proper coupling with the earth, the illustrated generator 20 is the specific gas exploder described in more detail in my copending application Ser. No. 314,230, filed Oct. 7, 1963, which is designed to receive an explosive charge of gases, such as a stoichiometric mixture of oxygen and propylene and to ignite such charge, confining the resultant explosion in a manner such that a substantial part of the force of the explosion is converted into seismic energy. Generator 20 is constructed, such that its bottom 21 is relatively movable with respect to its top 22 by relative movement at the joint between their sides, which joint, however, is sealed to prevent lateral escape of exploding gases, these being exhausted through an upright stack designed to muffle the sound of the escaping gases. In order to secure proper coupling of the impact of the explosion within generator 20 with the ground on which generator 20 rests, a substantial weight should be imposed on top 22.

In accordance with my present invention vehicle 30 is designed to impose such a weight on generator 20, as illustrated in FIGURE 2. To this end generator 20, which has a low, generally cylindrical construction, is further provided with a pair of short horizontal stub shafts 24 which project outwardly from top 22 of generator 20 diagonally opposite each other. Thus any forked device arranged to receive the pair of shafts 24 while clearing the remaining structure of generator 20 can be utilized to pick generator 20 up from the ground or to impose a downward force on generator 20, such force being exerted on top 22 of generator 20.

Basically vehicle 30 includes a forward tractor 40 and a rear carrier 50 which are interconnected by a hitch 80.

Tractor 40 includes a horizontal frame, i.e., bed 41 carrying on its underside an axle 42 on the ends of which are mounted a pair of wheels 43 positioned on opposite sides of bed 41. Axle 42 is suitably provided with reduction gearing in its connections with wheels 43, steering brakes for each wheel 43 independent of those for the other wheel 43 and a differential connection to an engine mounted on the forward portion of bed 41, positioned to the left of wheels 43 in FIGURES 1 and 2. A cab 44 can be provided on bed 41 for enclosing the operating controls 45 and the operator, and bed 41 further carries suitable hydraulic pumps, accumulators and the like with their associated controls to permit operation of the various components of vehicle 30 later described. Bed 41 as described more specifically with reference to FIGURE 3 is suitably constructed at its rear over axle 42 to receive hitch 80.

Carrier 50 has a rigid frame 51 constructed of channels and plates, as more specifically described with reference to FIGURES 5–8, and a pair of stub axles 52 laterally mounted on opposite sides of frame 51 adjacent the rear of carrier 50, and carrying a pair of wheels 53 disposed on opposite sides of frame 51. Forwardly of wheels 53 the underside of carrier 50 is open at its front end and frame 51 is free of any cross obstructions interfering with such opening except on the upper portion of frame 51 such that frame 51 forms a box-like structure, having only side walls and cross members at its rear and top, in which a forward generator support fork, generally designated by reference numeral 54, is mounted.

Figure 6:
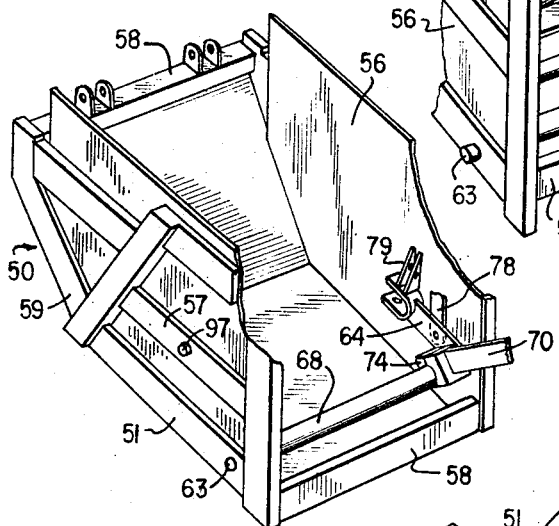
FIGURE 6 is a fragmentary perspective view of the same portion of the vehicle seen in FIGURE 5 but from a different angle of sight.

Referring more particularly to FIGURES 5 and 6, the forward portion of frame 51 includes a pair of vertical side plates 56 which extend lengthwise and are positioned parallel to each other to define the opposite sides of the forward portion of carrier 50. Plates 56 are preferably reinforced exteriorly by the employment of channels 57 welded to plates 56 with their open sides toward plates 56. Plates 56 are held in parallel relationship by means of heavy cross beams 58 extending between the forward upper corners of plates 56 and across the upper and lower of rear corners of plates 56. Generally the forward lower corner of each plate 56 is cut-off as indicated by the reference number 59.

The rear portion of frame 51 is generally defined by four beams 60 (see particularly FIGURES 7 and 8), a pair of which are secured at their forward ends near the outer ends of a beam 58 joining the upper rear corners of plates 56 and the other pair of which are secured at their forward ends close to the ends of a beam 58 joining the lower rear corners of plates 56. The rear ends of beams 60 are brought together and secured in a rectangular plate 61 and retain between them a horizontally positioned axle box 62 located just forward of plate 61. Stub axles 52 referred to above are mounted on opposite ends of axle box 62.

Figure 7:
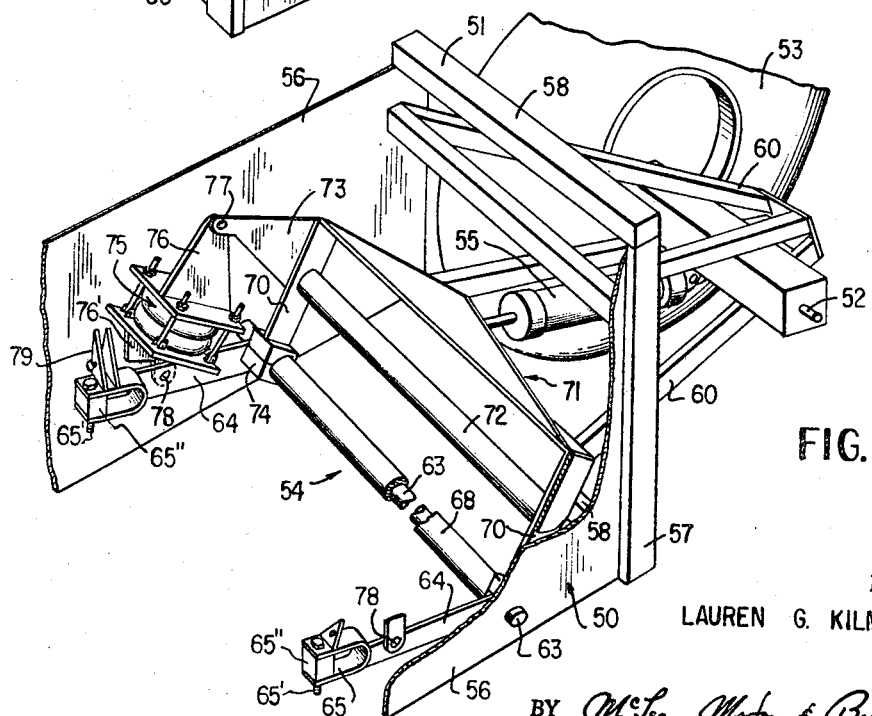
FIGURE 7 is yet a further fragmentary perspective view of another portion of the vehicle shown in FIGURES 1 and 2.

Referring to FIGURES 6 and 7, forward fork 54 is mounted on a shaft 63 journaled for rotation at its opposite ends in plates 56 near their lower rear corners just forward of the beam 58 joining such corners, such shaft 63 extends horizontally across the lower rear portion of the enclosure formed by plates 56 forward of wheel 53. Fork 54 is composed of a pair of forwardly-extending arms 64 which are affixed, e.g., welded, to opposite ends of a torque tube 68 which fits over and rotates about shaft 63. Arms 64 can be supported or braced relative to each other and the torque tube 68 by reinforcing plates if desired. Each arm 64 is provided with a clevis or fork element 65 for supporting a stub axle 24 of generator 20. A bolt 65' retains stub axle 24 in each clevis 65. Blocks 65" prevent movement of axle 24 in clevises 65. Also affixed to the torque tube 68 are a pair of upwardly extending arms 70 which are connected together by a framework 71 including tube 72. Each arm 70 is pivotally secured at one end to torque tube 68 adjacent a respective lower arm 64 by a pair of clamp members 74 which are bolted together and at the other end is attached to a forwardly extending arm 73 which forms therewith a bell crank. A shock absorber, e.g., a piston-cylinder assembly or an air cushion 75 is pivotally secured through frame member 76 at the outer end 77 of the forwardly extending arm 73 of each bell crank and through frame member 76' is pivotally secured at 78 to a respective forward arm 64. The shock absorbers, such as air cushions, each contain a compressible gas under pressure, e.g., air at a pressure of about 90 to 100 p.s.i., whereas piston-cylinders can use nitrogen at higher pressures, e.g., 400 to 450 p.s.i. The absorbers cushion shocks transferred between the generator 20 and the carrier 50 by compression of the gas in the cylinder. Only one shock absorber is shown in FIGURE 7 for clarity.

A double acting jack 55 (see FIGURES 7 and 8) pivotally secured at its rear end to framework 51 beneath axle box 62 is pivotally secured at its forward end to the center of framework 71 at a point remote from shaft 63 and torque tube 68. The disposition of jack 55 is such that it can be extended to a position in which the upper portion of framework 71 is moved forward thereby lowering the forward ends of cranks 64 and hence dropping clevises 65 downwardly through the opening defined in the underside of carrier 50 between side plates 56. When jack 55 is retracted, the forward ends of cranks 64 are raised up along side plates 56. The connection of the shock absorbers 75 between the forwardly extending arm 73 and lower arm 64 limits relative movement therebetween and when the jack 55 is fully retracted, the angle between the upwardly extending arm 70 and lower arm 64 is between about 95° and 125° and generally is between approximately 110° and 115°. Because of the proximity of cranks 64 to side plates 56, suitable fastening arrangements can be provided, such as indicated by the reference number 79, for pinning each clevis 65 to the side of the adjacent side plate 56 in order to prevent accidental lowering of fork 54, for example, when traveling on the highway.

Referring to FIGURES 1 and 2, hitch 80 is mounted on bed 41 of tractor 40 over axle 42 such that it is free to rotate horizontally on an axis extending lengthwise of and centered between wheels 43 with respect to tractor 40 and, through suitable jacks described more specifically with reference to FIGURE 3, can be controlled to rotate about a second axis perpendicular to and intersecting such horizontal axis. Such second axis is normally vertical when wheels 43 and 53 all rest on a common place. Hitch 80 is further secured to frame 51 of carrier 50 at the rear end of hitch 80 such that carrier 50 is free to rotate about a horizontal axis with respect to hitch 80 disposed forward of and parallel to the axial line of wheels 53. Rotation of carrier 50 with respect to hitch 80 about such axis is under the control of jack and lever arrangements described with reference to FIGURE 3.

More particularly referring to FIGURES 3 and 4, hitch 80 is composed of two principal parts, a pivot base 81 and a yoke 82. Pivot base 81 referring to FIGURE 3 is formed of a heavy beam positioned horizontally above bed 41 over axle 42 and is pivotally mounted on bed 41, as indicated by the reference numbers 83, to permit the above described rotation of hitch 80 about a horizontal axis centrally and longitudinally disposed with respect to tractor 40.

Base 81 at its rear end is slightly elevated and carries a cross member affixed to it which forms a pair of wings 84, one on each side of the rear end of base 81. At its forward end base 81 is provided with an upright post 85 slightly canted to the rear of the vehicle which at its upper end defines a clevis 86 for receiving a tongue 87 on yoke 82.

Yoke 82 is composed of a pair of arched frame members 88, a cross beam 89 and a pair of side arms 90. Arched frame members 88 are set on an angle, joined together at their forward ends and spread apart at their rearward ends which are secured, spaced apart, on transverse beam 89 to which they are attached. Arms 90 are attached at their forward ends to opposite outer ends of beam 89 and extend downwardly and rearwardly parallel to each other. Arched frame members 88 where they are joined together at their forward ends carry tongue 87 and continue downward together terminating in a post pivotally received in base 81 between post 85 and wings 84 to provide a pivotal connection which is rotatable about a vertical axis when post 85 is in its most upright position and which is vertically aligned with a similar pivot pin joining clevis 86 and tongue 87. Thus yoke 82 can oscillate about an axis which is perpendicular to the horizontal axis of rotation of base 81 on bed 41. The structure is so formed to permit forming more than 90° oscillation of yoke 82 horizontally to either side of base 81 from its normal rearwardly extended position.

A pair of double acting jacks 91, one located on each side of hitch 80, are employed to control the rotational movement of yoke 82 with respect to base 81. Thus a jack 91 is pivotally secured at one end to the outer end of each wing 84 and at its other end is pivotally secured, as indicated by the reference number 92, to structure secured to the adjacent side of an arch frame member 88 at the forward end of such frame member where it is joined to the other frame member 88 between the pivotal connection of tongue 87 with post 85 and the pivotal connection of frame members 88 in base 81.

The upper portions of arch frame members 88 where they are spaced from each other intermediate their ends carry between them a horizontal, transversely disposed mounting shaft 93 which is secured at each end in a frame member 88 and thus extends between them. A pair of crank arms 94 are mounted between arch frame members 88 with their forward ends rotatably received on shaft 93 and with their rear ends pivotally secured to the upper ends of link rods 95 the lower ends of which are pivotally secured to a cross beam 58 joining the upper forward corners of side plates 56 of carrier 50. The centers of crank arms 94 are located physically between frame members 88 and centrally over beam 89. A pair of double acting jacks 96 are vertically positioned between beam 89 to which they are pivotally secured at their lower ends and the centers of cranks 94 to which they are pivotally secured at their upper ends. If desired, a single double acting jack 96 of suitable size may be used in place of the pair of jacks.

Arms 90 extend rearwardly about opposite sides of carrier 50 to which they are secured at their ends remote from beam 89 by pivotal connections 97 mounted in side plates 56 at positions slightly behind the centers of such plates such that pivots 97 are aligned on a horizontal axis extending transversely of carrier 50. It will be apparent, referring particularly to FIGURES 1 and 2, that retraction of jacks 96 pulling the centers of cranks 94 downwardly causes the forward end of carrier 50 to be pushed downwardly relative to beam 89 which is located just forward of the front end of carrier 50. Since arms 90 are rigidly part of hitch 80, the retraction of jacks 96 thus causes carrier 50 to be rotated counter-clockwise, as seen in FIGURES 1 and 2, relative to the transverse horizontal axis on which pivots 97 are located.

In operation when it is desired to employ vehicle 30 to transport a generator, such as generator 20, to a position of use, vehicle 30 is maneuvered to a position alongside generator 20 in which generator 20 is approximately adjacent beam 89 of hitch 80. By manipulating jacks 91 and backing tractor 40 such that carrier 50 and tractor 40 "jack knife" to move the forward open end of carrier 50 in front of generator 20, vehicle 30 is then maneuvered forward to bring carrier 50 into a position over generator 20 with generator 20 between side plates 56 of frame 51. Jack 55 is then extended to lower the forward portion of front fork 54 such that clevises 65 receive stub shafts 24 of generator 20. Blocks are then positioned and pinned in the open ends of clevises 65 to retain stub shafts 24 seated in clevises 65.

After manipulating jacks 91 to straighten vehicle 30, jacks 96 are retracted to cause carrier 50 to rotate counterclockwise, as seen in FIGURE 2. Since the center of gravity of vehicle 30 is forward of the position of generator 20, such counterclockwise rotation of carrier 50 lifts wheels 53 from the ground causing the entire weight of the vehicle to be supported on forward wheels 43 and generator 20 through the torque tube 68 and cylinder-piston units 75 and 76. Generator 20 then is fired, for example, in the manner described in my above noted copending applications Ser. Nos. 187,111 and 314,230. (In this connection it should be noted that carrier 50 can suitably be employed for housing gas storage cylinders used to charge generators 20 which, for example, can be mounted across side plates 56 preferably over the position of generator 20 in order to maximize the weight directly imposed on generator 20. Such a housing for gas storage cylinders is shown in FIGURES 1 and 2 indicated by the reference numeral 100). When generator 20 is fired, a seismic wave is immediately generated by the explosion and a large force is created which tends to raise the vehicle. Due to the large mass of the vehicle, this is largely prevented and secondary seismic waves are avoided. However, there is still a great amount of force which is received by the vehicle and absorbed by the cylinder-piston units 75 and 76 between the forwardly extending arms 64 which support the generator 20 and frame 51. Also, the torque tube 68 helps absorb such shocks. Piston-cylinder units 75 and 76 absorb the shocks by compression of gas within cylinder 75 as the piston attached to rod 76 is forced into the cylinder. Torque tube 68 will tend to even out the shocks applied to the individual sides of the vehicle as for example when the generator is fired on an uneven surface.

After firing generator 20 can be moved to its next location of use by extending jacks 96 to restore vehicle 30 to its normal position shown in FIGURE 1 (with, however, generator 20 still retained in fork 54) and jack 55 can be retracted to lift generator 20 from the ground such that it can be moved to such next position of use by vehicle 30 while retained in forward fork 54. Retraction of jack 55 will rotate framework 71 clockwise and torque tube 68 and cylinder-piston units 75 and 76 work together to also pivot the forwardly extending arms 64 clockwise so as to raise the generator 20 which is supported in the clevises 65 attached to arms 64. During raising of generator 20 the pistons 76 will be fully extended in cylinders 75 and the gas contained therein on the lower side of the piston will be under maximum compression.

It is claimed:

1. In the combination of an earth-interface pulse type seismic wave generator and a vehicular mass for superposition thereon in which said vehicular mass is a wheeled vehicle, generator support means mounted on said vehicle engaging said generator and mounted for movement between positions in which said generator is relatively lower and relatively higher on said vehicle, and operator means attached to said generator support means for moving said generator to said positions, the improvement wherein said generator support means comprises a pivot rod, a pair of lower arms arranged on opposite sides of said vehicle, each said lower arm being adapted to engage at one end a side of said generator and lift said generator and each said lower arm adjacent the other end thereof being pivotally arranged for pivoting about said rod, an upper arm associated with each said lower arm and arranged to pivot about said rod, and shock absorber means connecting a respective lower arm to the adjacent upper arm.

2. The improvement defined in claim 1 including a torque tube surrounding said pivot rod and slidable thereon, said lower arms being rigidly secured at one end to said torque tube adjacent the opposite ends thereof and said upper arms being pivotal about said torque tube adjacent associated lower arm.

3. Apparatus as defined in claim 2 wherein each said shock absorber means is an air cushion mounted in a frame, pivotally connected at opposite sides thereof to a respective one of said lower arms and to the adjacent said upper arm.

4. The improvement of claim 3 wherein said vehicular mass is a wheeled vehicle including first supporting wheel means thereon second supporting wheel means thereon, the center of gravity of the mass of said vehicle not including that of said generator being located and said generator support means being located between said first and said second wheel means, operator means operatively connected to said upper arms for moving said generator to said positions, whereby when said generator is thereby moved to said lower position a portion of said vehicle is elevated and the mass of said vehicle is supported on said first wheel means and on said generator.

References Cited

UNITED STATES PATENTS 2,772,746 12/1956 Merten _____ 181—.5
3,159,232 12/1964 Fair _____ 181—.5

BENJAMIN A. BORCHELT, *Primary Examiner.*

G. H. GLANZMAN, *Assistant Examiner.*